Feb. 23, 1932.    J. F. HAMPTON    1,846,328
AIRCRAFT CONSTRUCTION
Filed Jan. 23, 1930    2 Sheets-Sheet 1
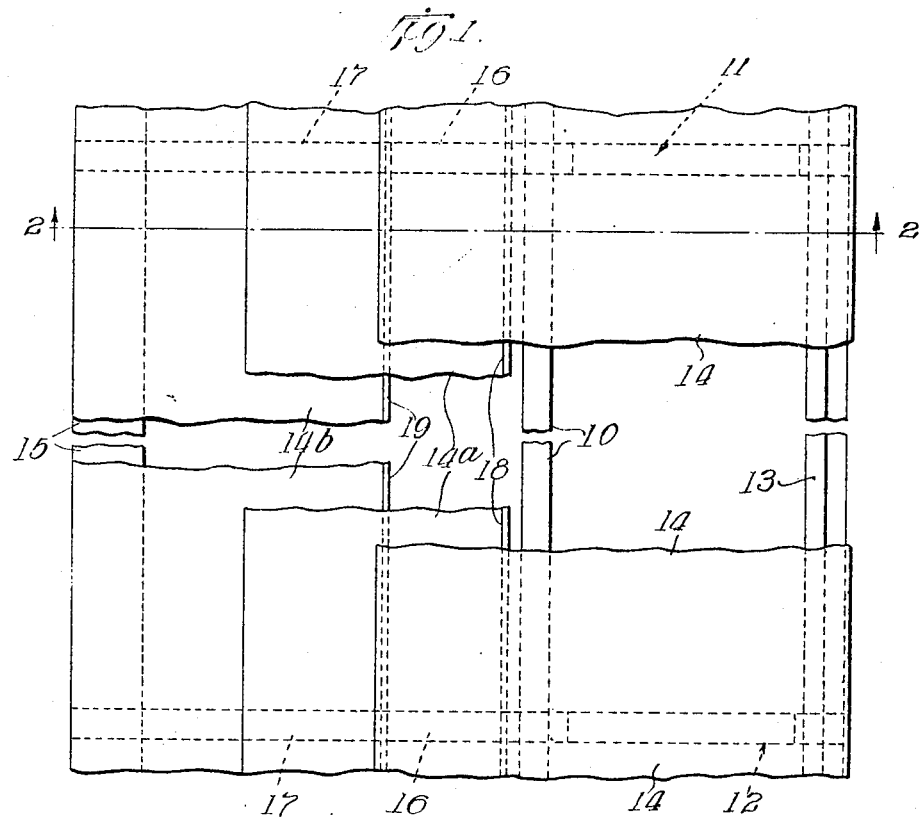
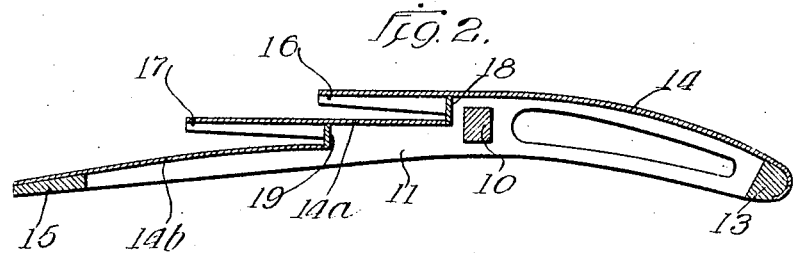
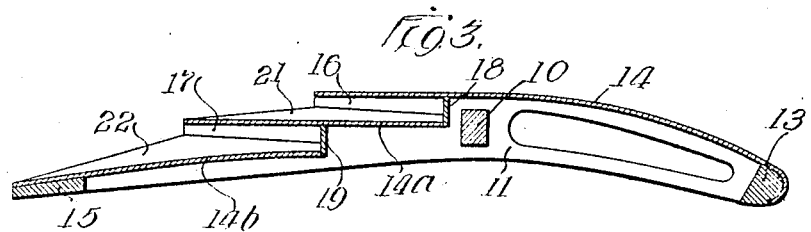
Witnesses:
Harry R. L. White
Robert Cremer
Inventor:
Judson F. Hampton
By Harvey L. Hanson
Attorney Feb. 23, 1932. J. F. HAMPTON 1,846,328
AIRCRAFT CONSTRUCTION
Filed Jan. 23, 1930  2 Sheets-Sheet 2
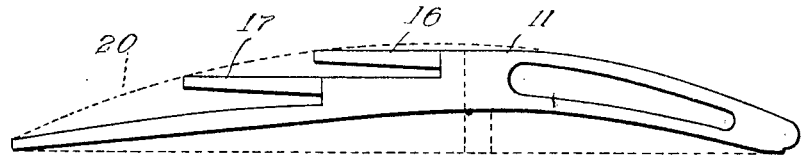
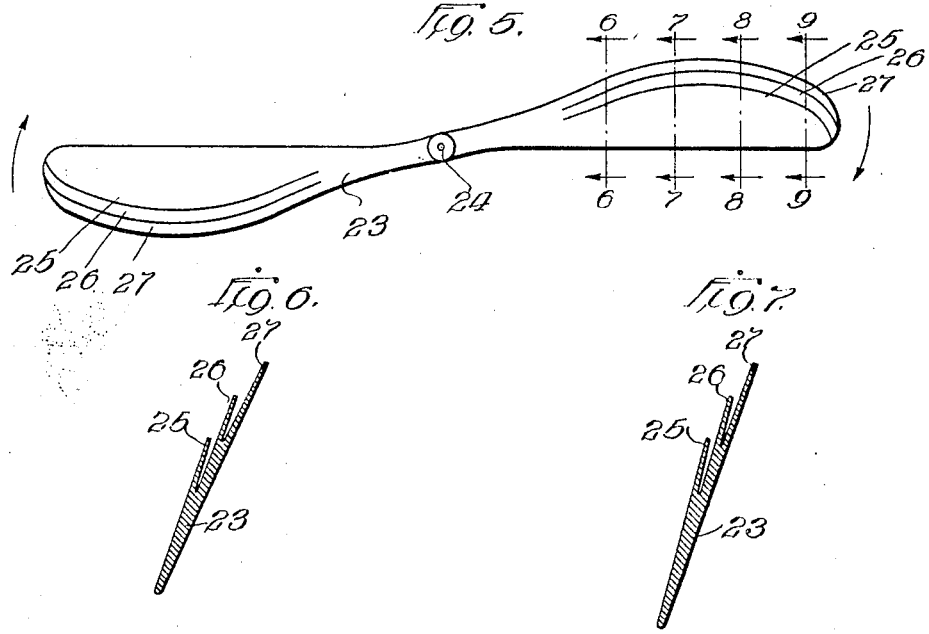
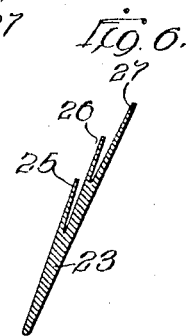
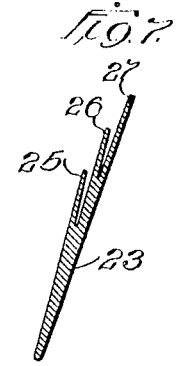
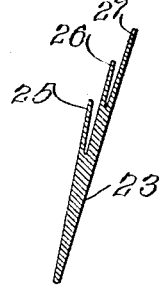
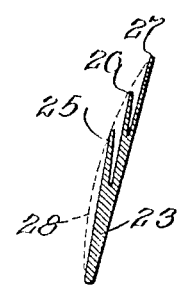

Patented Feb. 23, 1932

1,846,328

UNITED STATES PATENT OFFICE

JUDSON F. HAMPTON, OF CHICAGO, ILLINOIS

AIRCRAFT CONSTRUCTION

Application filed January 23, 1930. Serial No. 422,700.

My invention relates to air-craft construction and particularly to an improved construction of parts or members of air-craft, which are employed to utilize the air pressure thereon resulting from the movement of the parts or members through the air, whether the parts or members be supporting wings, propellers or any other parts or members of the air-craft.

When air-craft generally, whether heavier or lighter than air, movement of the air-craft through the air results from the action of a propeller or propellers of one kind or another, and however the propeller may be constructed, it is provided with one or more surfaces subjected to air pressure developed by movement of the propeller, which for convenience may be termed high pressure surfaces, and another surface or surfaces which for convenience may be called low pressure surfaces, upon which it is desirable to reduce air pressure to a minimum during the operation of the propeller, to the end that the tractive force produced by the propeller may be exerted with maximum efficiency upon the air-craft.

Again, with either type of air-craft, guiding or directing members are employed, to control movement of the air-craft vertically and horizontally, each of which members is subjected to air pressure on one of its surfaces during its operation, which surface may for convenience be called its high pressure surface, while at the same time its other surface should preferably be subjected to minimum air pressure to most effectively produce the control exerted by said member, which other surface may for convenience be called the low pressure surface of the member.

Again, in connection with air-craft of the heavier than air type, supporting wings of one kind or another are employed, one surface of each of said wings being subjected to air pressure as a result of the movement of the wing through the air, which pressure is effective in supporting the wing and its load in the air, which side of the wing may be called for convenience, its high pressure side, while it is desirable to subject the other side of the wing to as little air pressure as possible, to the end that the supporting action of the wing may be a maximum, which other side of the wing may for convenience be called its low pressure side. Parts or members operating as described, may be generically termed air-thrust members.

My invention has for its object, constructing the low pressure sides or surfaces of air-thrust members of air-craft, so that the air pressures upon them shall be a minimum when said members are moved through the air in performing their intended functions.

This I accomplish by providing the low pressure surface of the member, with a succession of conformations producing rarefied areas distributed over the surface of the part or member, which conformations at the same time are so related as to produce a stream line flow of the air over the low pressure surface as a whole and without reactive pressures upon the surface which would nullify, wholly or in part, the beneficial effect of the rarefied areas.

More specifically, by my construction I provide the low pressure surface of the member, with a succession of overlapping elements extending transversely of the direction of motion of the element through the air, and extending preferably throughout the active length of the member, which elements overlap each other laterally and are separated from each other at their trailing edges, the amount of the separation being small relatively to the width of said elements, and the planes of said elements being substantially in the plane or planes of movement through the adjacent air, the stepped arrangements of the elements resulting in the air flowing from the trailing edge of a forward one of said elements to the surface of the next succeeding element, without a marked change in the direction of the air flow.

In this manner, I produce a rarefied area under and immediately to the rear of the trailing edge of each of the overlapping elements, and in this way by using a plurality of the overlapping elements, I produce a distributed condition of rarefied areas over the low pressure surfaces of the member, and the result is a maximum differential between the air pressure on the high pressure surface of the member and the air pressure on its low pressure surface, causing the member to operate with maximum efficiency in accomplishing its intended purpose, whether that purpose be propelling the aircraft through the air, directing its course as it moves through the air, supporting it in the air, or any other function affected by air-thrust upon the member.

My invention will best be understood by reference to the accompanying drawings, which are illustrative of the application of my invention to a supporting wing of an aircraft of the heavier than air type, and to a propeller construction which may be used generally with air-craft of any type, said drawings being as follows:

Figure 1 illustrates a part of a supporting wing of an air-craft in plan view,

Figure 2 is a transverse sectional view of the construction shown in Figure 1 taken along the line 2—2, Figure 3 shows in a view similar to Figure 2, a form of bracing construction that may be employed to reinforce the overlapping elements, Figure 4 illustrates in side elevation a rib construction that may be used with the wing construction illustrated in Figures 1, 2 and 3, Figure 5 illustrates in plan view a propeller provided with overlapping elements in accordance with my invention, and Figures 6, 7, 8 and 9 are transverse sectional views of the construction shown in Figure 5 taken along the lines 6—6, 7—7, 8—8 and 9—9, respectively.

Similar numerals refer to similar parts through out the several views.

As shown in Figure 1, the wing construction illustrated consists of a main supporting bar 10 extending longitudinally of the wing, which carries a plurality of ribs 11 and 12 extending transversely of the wing, the ribs supporting at their forward or leading ends, a cross bar 13 to which the forward or leading edge of the covering 14 of the wing is secured, by being fastened to the under side of the bar 13 and then wrapped around it and over the forward portions of the ribs 11 and 12. The ribs also support at their trailing ends, a cross bar 15 to support the trailing edge of the covering of the wing.

The ribs have a stepped construction on their upper edges, as illustrated for the rib 11 in Figure 2, above which, members 16 and 17 extend from each rib rearwardly, so that the trailing end of each of these extensions projects slightly beyond the forward end of the next succeeding rib extension, the upper edges of the extensions being preferably in nearly parallel relation and in the general direction of stream flow of air over the upper surface of the wing.

The covering 14 is extended rearwardly to the rear ends of the extensions 16. A second part of the covering 14a, begins at the forward ends of the extensions 16 and extends rearwardly to the rear ends of the extensions 17. The remaining part of the covering 14b, begins at the forward ends of the extensions 17 and continues to the rear edge of the cross bar 15.

These several portions 14, 14a and 14b of the wing covering extend from end to end of the wing, and as a result of the construction of the rib extensions 16 and 17 above described, the rear portion of the covering 14 constitutes an element overlapping the forward portion of the covering 14a and separated from it an amount less than the width of the overlapping portion. Similarly, the rear portion of the covering 14a constitutes an element overlapping the forward portion of the covering 14b, and separated from it by an amount less than the extent of the overlap.

The covering 14a is connected at its forward edge with the covering 14 by a vertical strip of suitable material 18, and the forward edge of the covering 14b is connected with the covering 14a by a similar strip of suitable material 19, these strips 18 and 19 serving to prevent air flow from the lower or high pressure surface of the wing between the overlapping wing elements.

When a wing constructed as described moves through the air to perform its intended supporting function, the air flowing over the upper surface of the covering 14, passes from the trailing edge of said surface to the trailing portion of the covering 14a and from the trailing edge of the covering 14a, to the trailing portion of the covering 14b, as illustrated generally by the dotted line 20 in Figure 4.

As a result, a rarefied atmospheric condition is produced under the trailing portion of the covering 14 and to its rear between the air stream flowing over the wing and the covering 14a, which is maintained on account of the strip 18 connecting the forward edge of the covering 14a, with the covering 14.

Similarly, a second area or zone of rarefied air is produced under the rear portion of the covering 14a and to the rear of said portion, between the air stream flowing over the wing, and the covering 14b, which is maintained by the connection of the covering 14b with the covering 14a by the strip 19.

These rarefied areas are effective in producing a much more effective lift on the wing than if the rarefied areas were not present.

It will be understood that the supporting structure of the wing may be of any desired form, and that the ribs may be of any desired construction and that any desired material, whether wood or metal, may be employed in making the wing structure; also, that the coverings may be of any desired material, whether fabric or metal, the important consideration being that the several coverings of the wing shall be so arranged as to provide stepped elements substantially as and for the purpose described.

It will further be understood that any desired number of such stepped elements may be employed and distributed as desired over the upper surface of the wing, to the end that any desired distribution of rarefied air areas may be produced on the upper surface of the wing; also, that the size and proportions of the elements may be made as desired to meet the requirements of different wing shapes and constructions.

The lower, or high pressure surface of the wing, may be constructed in any desired manner, to meet the requirements of any particular type of machine.

In Figure 3, the construction is the same as above described, with the exception that reinforcing members 21 and 22 are shown between the rib extensions 16 and 17 and the other parts of the rib structures, to support the rib extensions somewhat more positively than where said reinforcing members are not employed.

In Figure 4, I illustrate one of the rib structures, for example the rib 11, removed from the rest of the wing structure, to show in a general way, the relation of the air flow indicated by the dotted line 20, to the rib construction, which rib construction of course, determines the shape of the covering surfaces of the wing engaged by the air flowing over its upper surface.

The air stream closing as it does the rear sides of the compartments formed by the overlapping elements of the wing, produces areas or zones of rarefied air pressure between these overlapping elements in the manner and with the results above described.

In Figure 5, I illustrate a propeller 23 designed for rotation around an axis 24, in the direction indicated by the arrows, the low pressure surfaces of the propeller, being provided with overlapping elements 25 and 26, related as more clearly shown in Figures 6–9 inclusive.

The relation between these overlapping elements is, in effect, as above described in connection with the overlapping elements of the wing shown in Figures 1 and 2, with the result that distributed rarefied areas or zones are produced on the low pressure surfaces of the propeller, making much more efficient the tractive pressures produced on the high pressure surfaces of the propeller.

In Figure 9, I illustrate by the dotted line 28, the general direction of the air stream flow over the low pressure surface of the corresponding blade of the propeller, this flow being related to the overlapping elements of the propeller in the same manner that the air stream flow indicated at 20 in Figure 4, is related to the overlapping elements of the wing.

My improved construction is applicable to air-craft propellers generally and of whatever material they may be made, also whether the propellers be made integrally with the overlapping elements, or of a built-up construction, and whether the materials of the overlapping elements are the same as the material of the body portion of the propeller or not.

It will be understood that my invention above described is applicable generally to members of any kind employed in connection with air-craft, where the function of the member is to produce thrust or pressure of any kind upon the air-craft by the action of unequal air pressures on different surfaces of the member.

In any such case, where an effective air pressure is produced on one side of the member, it is desirable to reduce as much as possible, the air pressure on another side of the member, and my invention is effective for the reasons described, in so reducing the pressure to a marked degree.

While I have shown my invention in the particular embodiment above described, it will be understood that I do not limit myself to this exact construction as I may employ equivalents known to the art at the time of the filing of this application without departing from the scope of the appended claims.

Having thus described the invention, what I claim and desire to secure by Letters Patent is:

1. A wing for air-craft comprising the combination of a supporting structure, a covering on a low pressure surface thereof having a plurality of overlapping elements in stepped and separated relation extending longitudinally of the wing, the outer surfaces of said elements being in substantially streamline relation laterally of the wing producing rarefied areas distributed over the low pressure surface of the wing, the spaces between said elements being always and permanently closed at their forward sides and open at their rear sides.

2. A wing for air-craft comprising the combination of a supporting structure, a covering on a low pressure surface thereof having a plurality of overlapping elements in stepped and separated relation extending longitudinally of the wing, the outer surfaces of said elements being in substantially stream-line relation laterally of the wing producing rarefied areas distributed over the low pressure surface of the wing, the spaces between said elements being open rearwardly and closed on all other sides.

3. A wing for air-craft comprising the combination of a supporting structure, a covering on a low pressure surface thereof having a plurality of overlapping elements in stepped and separated relation extending longitudinally of the wing, the outer surfaces of said elements being in substantially stream-line relation laterally of the wing producing rarefied areas distributed over the low pressure surface of the wing, said supporting structure including ribs extending laterally of the wing and having extensions supporting the overhanging portions of said elements.

4. An air-thrust member for air-craft comprising a structure for movement through adjacent air and having a low pressure surface, and a plurality of spaced elements on said surface extending in a direction crossing the direction of movement of said structure, said elements having overlapping portions extending away from the direction of said structure movement, the compartments between said elements being always and permanently closed forwardly and open rearwardly.

5. An air-thrust member for air-craft embodying a propeller for air-craft having low pressure surfaces, and a plurality of spaced and overlapping elements extending radially on each of said surfaces, the outer overlapping portions of said elements extending angularly of the propeller towards the trailing portions of said surfaces, the compartments between said elements being always and permanently closed forwardly and open rearwardly.

In witness whereof, I hereunto subscribe my name this 18th day of January, A. D. 1930.

JUDSON F. HAMPTON.